United States Patent Office 3,451,249
Patented June 24, 1969

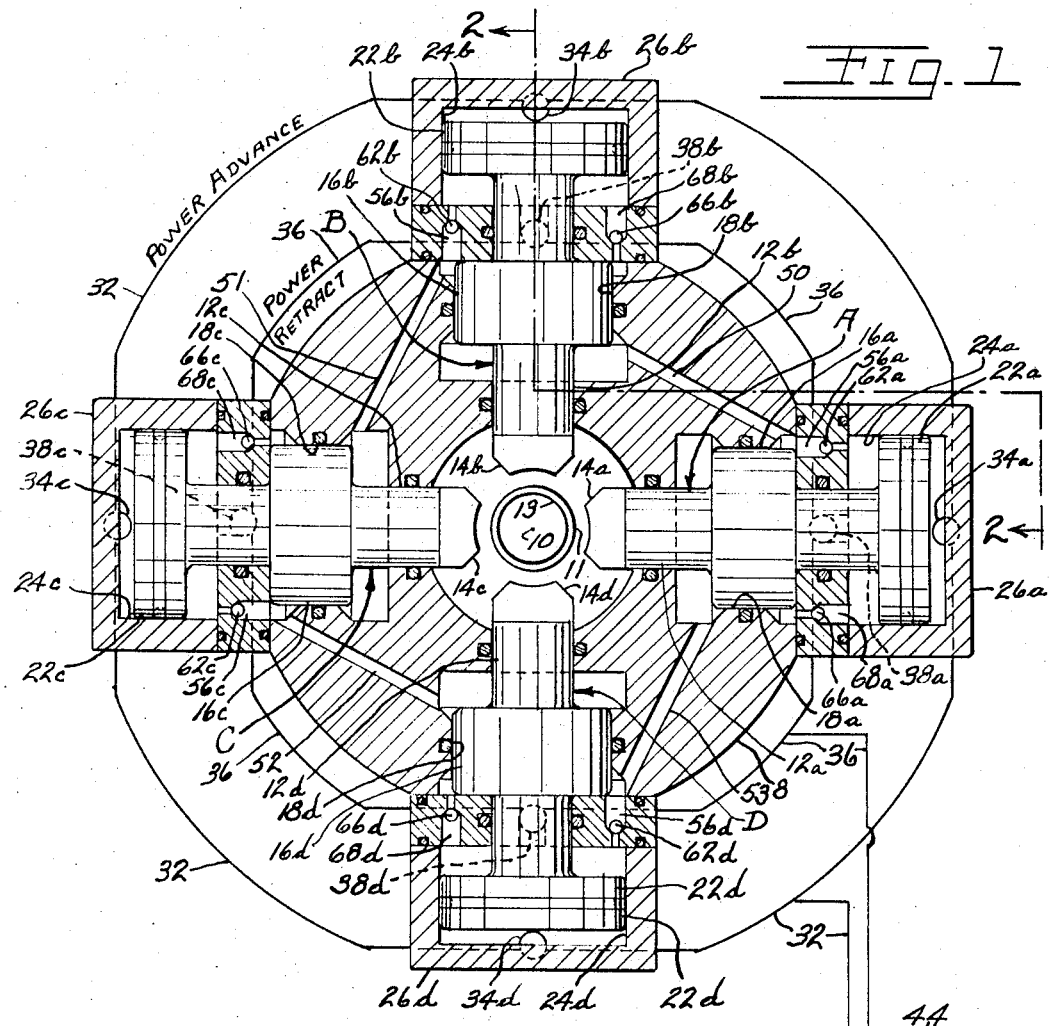

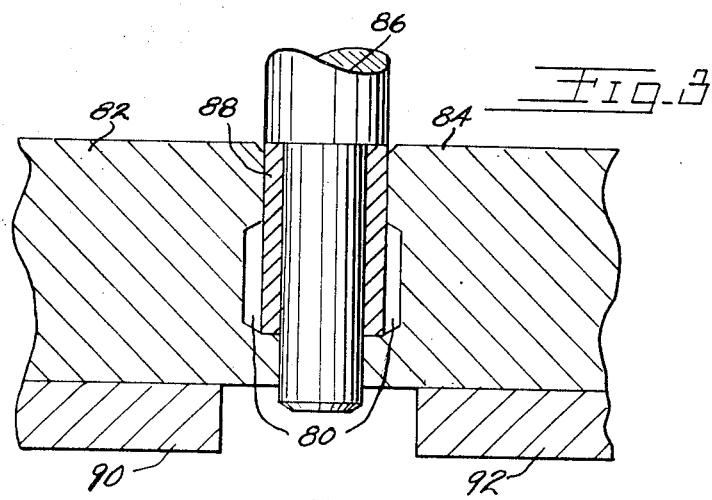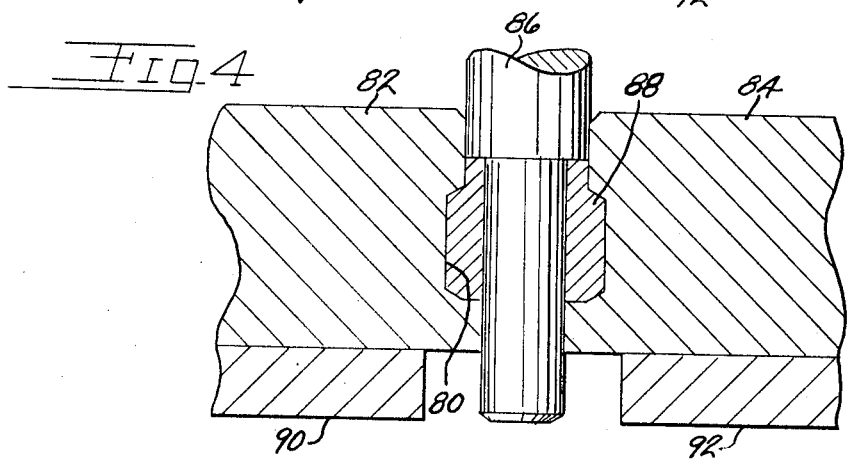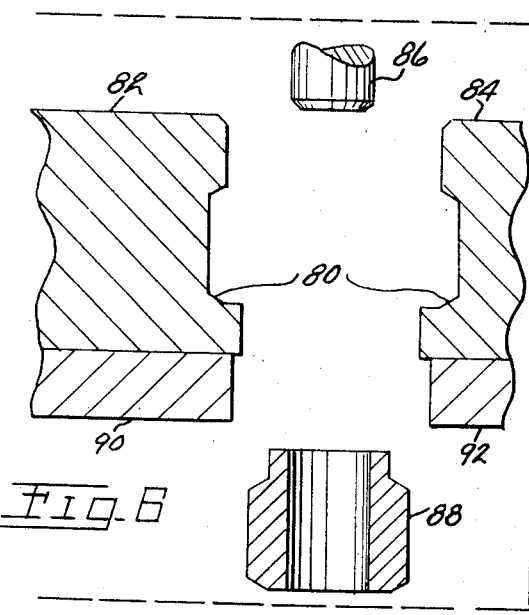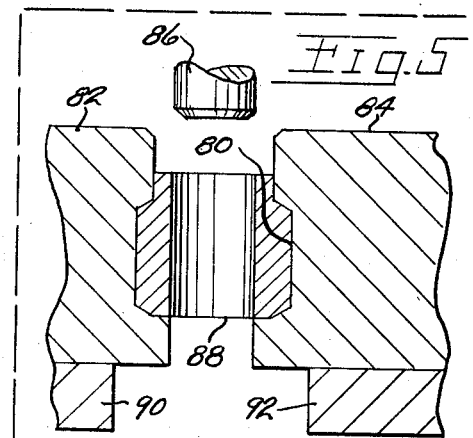

3,451,249
FORMING MACHINE
Wilfred J. Sharon, 25280 Chatworth Drive,
Euclid, Ohio 44117
Filed Oct. 10, 1966, Ser. No. 585,399
Int. Cl. B21d 31/00, 41/00; B21j 7/16
U.S. Cl. 72—402                                                  21 Claims

ABSTRACT OF THE DISCLOSURE

A rotary compression forming machine including a plurality of radially mounted preconfigured segmental dies mounted for reciprocation in unison to a common central point at which is disposed a workpiece to be formed. A suitable actuating means is provided for effecting an applied load to the dies for reciprocating the same in unison to and away from the workpiece in the form of synchronized hydraulic piston-cylinder power mechanisms on each of the dies.

Coacting hydraulic equalizing means are also provided on the dies for equally balancing the applied load between all of the dies when they contact and form the workpiece, such equalizing means including a hydraulic piston-cylinder control mechanism on each die with the control piston thereof being directly secured to the die, and including hydraulic conduit means containing pressurized hydraulic fluid, said conduit means including conduits connecting the bottom side of each control cylinder with the top side of the next adjacent control cylinder, in series around the circle in a closed circuit, whereby the hydraulic fluid is pressure fed from the bottom of each control piston to the top side of the next adjacent control piston in series around the circle in a closed circuit to equalize linear displacement of the dies and to equally balance the applied load between the dies.

---

This invention relates to forming machines and more particularly to such machines having a plurality of dies reciprocable to a common center-point to form a part thereat, or to form a segmented pressure vessel cavity in which a part may be pressure formed by a ram entering the cavity.

Rotary compression forming machines of the present type involve a plurality of radially mounted segmental dies reciprocable in unison to a common central point to forge or crimp a part or workpiece thereat. The dies may be reciprocated by hydraulic piston-cylinder power mechanisms. Under current practice, increasingly higher forming pressures are being employed, thus necessitating substantially higher hydraulic fluid pressure in the piston-cylinder power mechanisms.

With segmental pressure forming machines, wherein a plurality of radially mounted dies are reciprocated in unison to a common point to form a pressure cavity in which a workpiece is forged by a separable ram entering the cavity, extremely high hydraulic fluid pressures must be used in the piston-cylinder power mechanisms reciprocating the dies to retain the segmental dies in position while the ram is forging or pressure-forming a workpiece within the cavity.

Such high pressures entail many serious disadvantages. One problem is that it is most difficult, if not impossible, to accurately synchronize reciprocation of the dies in unison to and away from the center-point under such high pressures. A further problem is equally balancing the radially applied load or forming pressures between all of the dies in response to the resistance of the workpiece as the dies contact and form the same. When the forming pressure is not equally balanced, bursting of the die and/or the workpiece usually occurs. A still further problem in segmental pressure vessel forming machines is providing a means for relaxing and then withdrawing the dies forming the part to simplify ram withdrawal and part ejection, and to reduce die wear.

Therefore, it is an object of the invention to provide a high pressure radially reciprocal die forming machine wherein the dies are reciprocated in substantially perfect unison to and from the workpiece.

A further object of the invention is to provide a forming machine of the above type wherein the forming pressure or applied load is equally balanced between all of the dies in response to the resistance of the workpiece.

A further object of the invention is to provide a high-pressure forming machine wherein provision is provided for relaxing the dies after the part is formed to permit facile ram withdrawal.

A further object of the invention is to provide a high pressure segmented pressure vessel forming machine wherein the workpiece is quickly and simply ejected from the pressure vessel cavity after the part is formed.

A further object of the invention is to provide a high pressure radially reciprocable die forming machine that is simple in construction, inexpensive to manufacture, and highly effective in operation.

Briefly, the foregoing objects are accomplished by the provision of a forming machine including a plurality of radially mounted preconfigured dies mounted for reciprocation to a common point at which is disposed a workpiece to be formed. A suitable actuating means is provided for effecting an applied load to the dies for reciprocating the same in unison to and away from the workpiece to form such workpiece into a predetermined configuration, such actuating means, in the preferred form of the invention, being interconnected synchronized hydraulic piston-cylinder power mechanisms on each of the dies.

Coacting hydraulic equalizing means are also provided on the dies for equally balancing the applied load between all of the dies when they contact and form the workpiece. Such equalizing means includes a hydraulic piston-cylinder control mechanism on each die with the piston thereof being directly secured to the die, and including hydraulic conduit means containing pressurized hydraulic fluid, said conduit means including conduits connecting the bottom side of each cylinder with the top side of the next adjacent cylinder, in series around the circle in a closed circuit, whereby the hydraulic fluid is pressure fed from the bottom of each piston to the top side of the next adjacent piston in series around the circle in a closed circuit to equalize linear displacement of the dies and to balance the applied load between the dies.

With such hydraulic piston-cylinder control mechanism on each of the dies and interconnected between the dies as aforedescribed, there is provided a positive means for equalizing linear displacement of the dies so that they all arrive at the same time at the workpiece, with the applied load being equally balanced between all of the dies. Such structure also effects substantial reduction in die wear.

In a modification of the invention, there is provided a segmented pressure vessel forming machine including a plurality of preconfigured dies mounted in one plane in a circle for radial reciprocation to a center-point, and a ram containing a workpiece, such ram reciprocable to said point at a right angle to said plane. The dies are configured to form a pressure vessel cavity when the dies contact the workpiece. The hydraulic equalizing means aforementioned is connected to the dies for equally balancing the applied load between all the dies when contacting the workpiece. Means are provided for reciprocating the ram, with the workpiece thereon, in a direction into the die cavity, whereat at least a portion of the workpiece is forced by the ram into the cavity to fill the same and thereby cause the part to acquire a predetermined configuration, after which the ram is retracted from the cavity and thence the dies are withdrawn, in unison, to permit the part to drop into a tote box.

With this latter construction, die bursting and part bursting is substantially eliminated. Additionally, die wear is substantially reduced. Also, such construction effects production of many types of parts, such as couplings, faster, more accurately, and far more economical than heretofore possible.

Other objects and advantages of the invention will be apparent from the following description taken in conjunction with the drawings wherein:

FIGURE 1 is a horizontal sectional view of a forming machine constructed in accordance with the invention, and showing the piston-cylinder power mechanism control unit thereof in schematic form;

FIGURE 2 is a view taken along the lines 2—2 of FIGURE 1;

FIGURE 3 is a broken horizontal sectional view illustrating a modified segmental die structure of the machine shown in FIGURE 1, and showing the parts in position prior to the forming of the workpiece;

FIGURE 4 is a view similar to FIGURE 3, but showing the workpiece completely formed in the segmental die pressure vessel cavity;

FIGURE 5 is a view similar to FIGURE 4, but showing the ram withdrawn; and

FIGURE 6 is a view similar to FIGURE 5, but showing the dies withdrawn and the part ejected from the cavity.

Although the invention is shown described herein with reference to forming parts such as couplings for pipes and hoses, it will be understood that it may be used in any type of forming machine having radially reciprocable dies adapted to form a part at a common center-point. Additionally, although the radially disposed dies are shown and described as being reciprocated by hydraulic piston-cylinder mechanisms, the hydraulic equalizing means of the invention may be applied to any type of forming machine having radially disposed dies reciprocated by any suitable means.

Referring first to FIGURES 1 and 2, there is shown a forming machine of the invention and including a housing 8 containing a plurality of elongated radially-reciprocable preconfigured dies, generally designated as A, B, C and D, respectfully. Although four dies are shown, it will be understood that a machine of the invention may contain any suitable number of dies (at least two) disposed radially about a common point (such as the center-point 10) for crimping or cold-forging a part or workpiece 11 thereat. The workpiece 11 may be disposed on a centerpost 13. Since all of the dies A, B, C and D are similar in structure, only one will be described in detail, with similar parts of such dies being identified by the same number, with such number being followed by any of suffixes $a$, $b$, $c$ or $d$ pertaining to the dies A, B, C and D, respectively.

The die A includes an elongated shaft or die holder 12a having detachably secured thereto a preconfigured replaceable die 14a. The die holder 12a contains a control piston 16a operatively disposed in a bore or control cylinder 18a formed in the machine housing 8, and a power piston 22a operatively disposed in the bore of power cylinder 24a of the cylinder body 26a, which is secured to the housing 8 by the bolts 28a (FIGURE 2). Thus, each die has a pair of spaced pistons thereon, such as for example, the die A, which has the spaced pistons 22a and 16a.

The dies A, B, C and D are radially reciprocated to and from the center-point 10 to effect an applied load to the workpiece 11 thereat by actuating means in the form of the outer piston-cylinder power mechanisms on each die, such mechanisms being hydraulically interconnected, in series, as will now be described. For example, the die A is reciprocated by the piston 22a-cylinder 24a power mechanism which is actuated for its forward stroke to the center-point 10 by pressurized hydraulic fluid from the inlet or power advance conduit 32, such fluid entering the outer end of the power cylinder 24a through the port 34a. The return stroke of the die A away from the center-point 10 is effected by pressurized hydraulic fluid from the power retract conduit 36 entering the inner end of the power cylinder 24a through the port 38a.

The flow of hydraulic fluid through the conduits 32 and 36 is controlled by a standard hydraulic flow control unit, shown diagrammatically and generally designated as U. The control unit U includes the usual motor M, pump P, filter F, tank T, pressure valve 42, and four-way reversing solenoid valve 44. The control unit U is conventional and will not be described further in detail as such unit, per se, forms no part of the invention.

Thus, with the present structure, all of the dies A, B, C and D may be hydraulically reciprocated, in unison, to and away from the center-point 10. It will be understood that any suitable means for reciprocating the dies may be used, but the aforedescribed outer system of interconnected hydraulic piston-cylinder power mechanisms on each die is preferred. Also, it is preferred that all of the dies are to be mounted radially in a circle and in one plane as shown.

It is essential that all of the dies A, B, C and D arrive at the workpiece 11 at the same time. It is also essential that the applied load or pressure effected by the dies against the workpiece be equally balanced between all the dies in response to the resistance of the workpiece. These objectives are accomplished by a coating hydraulic equalizing means in the form of the inner interconnected piston-cylinder control mechanisms on each die, now to be described. The inner control cylinder 18a, 18b, 18c and 18d are hydraulically interconnected by hydraulic conduits 50, 51, 52 and 53. Specifically, the conduit 50 connects the top end of the cylinder 18a with the bottom end of the cylinder 18b, the conduit 51 connects the top end of the cylinder 18b with the bottom end of the cylinder 18c, the conduit 52 connects the top end of the cylinder 18c with the bottom end of the cylinder 18d, and the conduit 53 connects the top end of the cylinder 18d with the bottom end of the cylinder 18a. Such system provides a cushioning effect for the dies as they travel to and forge the workpiece whereby the applied load is equally balanced between all of such dies.

Such inner control system of piston-cylinder mechanisms and interconnecting conduits is charged on each reciprocal cycle with pressurized hydraulic fluid via the passageways 56a, 56b, 56c, 56d leading from the outer power cylinders 24a, 24b, 24c and 24d to the inner control cylinders 18a, 18b, 18c and 18d, respectively. Such passageways have preset pressure valves 62a, 62b, 62c, and 62d therein, respectively, which function to replenish the supply of pressurized hydraulic fluid to the inner control cylinders 18a, 18b, 18c and 18d, respectively, and their interconnecting conduits 50, 51, 52 and 53, when the pressure in such inner system is reduced to a predetermined minimum value. For example, if hydraulic pressure in the inner control system becomes too low, one or more of the preset valves 62a, 62b, 62c or 62d will actuate and admit pressurized fluid from the outer power system to such inner control system.

In like manner, if hydraulic pressure in the inner control system exceeds a certain value, one or more of preset pressure valves 66a, 66b, 66c and 66d will actuate and permit hydraulic fluid to flow from such inner systems through the passageways 68a, 68b, 68c and 68d, respectively, to the outer cylinders.

Thus, the outer piston-cylinder power mechanism on the die A, for example, is hydraulically interconnected to the inner piston-cylinder control mechanism by a pair of separable hydraulic conduits 56a and 68a with preset valves therein.

Air may be bled from such closed hydraulic fluid systems via the passageway 72 (FIG. 2) which is normally closed by the detachable plug 73.

Thus, the forming machine of the invention is provided with hydraulic equalizing means including an inner hydraulic piston-cylinder control mechanism on each die (such as, for example, the die A) with the piston 16a thereof being directly secured to the die, and including hydraulic conduit means in the form of conduits 50, 51, 52 and 53 containing pressurized hydraulic fluid and connecting the bottom side of each inner cylinder with the top side of the next adjacent inner control cylinder, in series, around the circle in a closed circuit, whereby hydraulic fluid is pressure fed from the bottom of each inner control piston to the top side of the next adjacent inner control piston, in series, in a closed circuit around the circle, to equailze linear displacement of the dies A, B, C and D as they travel to the workpiece 11, and to balance the applied load between the dies as they crimp or cold-forge the workpiece.

It will be understood that excessive pressure in the inner control system of piston-cylinder mechanisms could be relieved by a simple relief valve disposed in a passageway leading from such inner control system to the atmosphere. Likewise, such inner control system could be replenished with hydraulic fluid by any conventional pressurized hydraulic fluid supply source leading from the exterior of the machine via a passageway directly to such inner system. However, the present structure of passageways connecting the inner and outer piston-cylinder mechanisms, with preset pressure valves in such passageways is preferred as it provides means for automatically replenishing hydraulic fluid to the inner control system from the outer power system, and for automatically relieving pressure in the inner system to the outer system, such that no hydraulic fluid is wasted as it is always retained within the two (inner and outer) systems.

Reference is now made to FIGURES 3 through 6 which illustrate a modification of the invention. The forming machine of FIGURES 3 through 6 is similar to that of FIGURE 1, except that the plurality of radially-disposed coacting dies are configured to form a segmented pressure vessel cavity 80 when the dies are reciprocated in unison to their inner position around the center-point or centrally disposed workpiece. The term "segmented pressure vessel cavity" is defined as a cavity formed by a plurality of radially-disposed dies (including the dies 82 and 84 illustrated), when such dies are disposed at their inner reciprocable position around the center-point or workpiece. Also included is a reciprocal ram 86 having detachably secured thereto a workpiece 88 which is to be formed or cold-forged into a predetermined configuration, such as a coupling, as will later be described. The ram is reciprocated on a line at right angles to the dies, with the center-point being on such line. The ram 86 may be reciprocated by any suitable means.

In operation, the workpiece 88 is telescoped onto or detachably secured to the ram 86, after which the dies are reciprocated to their inner position to contact the ram and the workpiece as shown in FIGURE 3. Next, the ram 86 is forced downwardly so that the workpiece 88 is forced to fill or cold-flow into the cavity 80 as shown in FIGURE 4. Backup plates 90 and 92 are provided on the distal side of the dies with respect to the ram to retain the dies in horizontal operative position. Next, the ram 86 is withdrawn upwardly, thereby leaving the formed workpiece in the cavity 80 as shown in FIGURE 5, after which the dies are withdrawn outwardly thereby permitting the finished workpiece 88 to be ejected from the machine as shown in FIGURE 6.

The machine of FIGURES 3-6 is shown as being positioned in a horizontal plane with the ram 86 being vertically reciprocal (on the longitudinal line or axis of the ram) to the dies, such position of the machine permitting the finished workpiece to drop into a tote box when the dies are withdrawn. However, it will be understood that the machine may be positioned in a plane other than a horizontal plane providing the ram is reciprocal to and away from the dies at substantially a right angle thereto.

It will be appreciated that extremely high forming pressures may be effected with the present invention. In the FIGURE 3 machine, for example, it is essential that the dies be held in cavity-forming position under extremely high pressures while the workpiece 88 is being cold-forged in the cavity 80. Previously, such high pressures caused one or more of the dies to back-off slightly because the applied pressure was not distributed equally between such dies, thereby forming an imperfect part. However, with the coacting hydraulic equalizing means of the invention aforedescribed, all the dies share equally the applied load with the result that not only is the part formed uniformly, but the possibly of die or part bursting is practically eliminated. If the pressure under which the workpiece is being formed reaches a critical value, such part will not burst, but will simply flow between the segments or dies thereby preventing any further pressure buildup which may result in die or part bursting.

In the FIGURE 3 modification, all of the parts may be covered with a thin film of lubricant to permit easy withdrawal of the ram 86, easy withdrawal of the dies, and easy withdrawal of the part 88 from the machine as the dies are withdrawn. Also, the dies may be relaxed a few thousandths of an inch after the part 88 is formed and before the ram is withdrawn to permit easy withdrawal of the ram.

Thus, with the present invention, a variety of parts may be mass-produced at high speeds in a manner not heretofore possible. The present invention permits synchronization of the reciprocation of the dies and balancing of the applied load between the dies under extremely high pressures. Bursting of the die and/or the workpiece is substantially eleminated. Additionally, the life of the dies is substantially increased.

The terms and expressions which have been employed are used as terms of description, and not of limitation, and there is no intention, in the use of such terms and expressions, of excluding any equivalents of the features shown and described, or portions thereof, but it is recognized that various modifications are possible within the scope of the invention claimed.

The invention may also be employed for pressure forming powdered metal parts followed, if necessary, by a sintering operation.

What is claimed is:

1. A forming machine for forming an associated workpiece comprising, a plurality of preconfigured dies mounted for reciprocation to a common point, the associated workpiece being disposed at said point, actuating power means for effecting an applied load to the dies for reciprocating said dies in unison to and away from the workpiece to form the same into a predetermined configuration, and coacting hydraulic equalizing control means connected to the dies for equally reciprocating the dies to the workpiece and for equally balancing the applied load between all of said dies when they contact the workpiece.

2. The structure of claim 1 wherein said hydraulic equalizing means comprises a hydraulic piston-cylinder control mechanism on each die with the piston thereof being directly secured to the die, and hydraulic conduit means containing pressurized hydraulic fluid and connecting the bottom side of each cylinder with the top side of a next adjacent cylinder in a closed circuit whereby the hydraulic fluid is pressure fed from the bottom of each piston to the top side of the next adjacent piston in a closed circuit to equalize linear displacement of the dies and to balance the applied load between the dies.

3. The structure of claim 2 wherein said actuating means comprises an outer hydraulic piston-cylinder power mechanism disposed on each die with coacting hydraulic conduit means containing pressurized fluid interconnected to all such power mechanisms for reciprocating the dies in unison to and away from said point.

4. The structure of claim 3 wherein the hydraulic piston-cylinder power mechanism and the hydraulic piston-cylinder control mechanism on each die are hydraulically interconnected by a pair of separable hydraulic conduits leading from the bottom side of the power piston to the top side of the control piston, with one of said conduits containing a preset one-way valve for admitting pressurized fluid of predetermined pressure from the bottom side of the power piston to the top side of the control piston to replenish hydraulic fluid in the control mechanism, and with the other of said conduits containing a preset one-way valve for admitting pressurized fluid of predetermined pressure from the top side of the control piston to the bottom side of the power piston when the hydraulic fluid at the top side of the control piston exceeds a predetermined pressure.

5. The structure of claim 4 and further including a housing containing said hydraulic piston-cylinder control mechanisms and containing said dies, each of said hydraulic piston-cylinder power mechanisms being disposed on said housing outwardly of and connected to the respective dies, whereby each die has a control piston and a power piston connected thereto with the control cylinder being disposed in the housing and the power cylinder being disposed on the housing for ease in assembly and maintenance.

6. The structure of claim 2 wherein said dies are mounted radially in a circle and in one plane.

7. The structure of claim 6 and further including a centerpost disposed at said point and containing said workpiece, said dies being reciprocable to the workpiece to crimp the same and retract therefrom while it is held by the centerpost.

8. A segmented pressure vessel forming machine for forming an associated workpiece comprising, a ram mounted for reciprocation on a line, a plurality of preconfigured dies mounted for reciprocation to a point on said line, the associated workpiece being detachably secured to said ram substantially at said point, actuating means for effecting an applied load to the dies for reciprocating said dies in unison to and away from the workpiece, said dies being configured to form a pressure vessel cavity when the dies contact the workpiece, hydraulic equalizing means connected to the dies for equally balancing the applied load between all of said dies when the dies contact the workpiece, and reciprocating means for displacing the ram with the workpiece thereon in a direction along said line whereby at least a portion of the workpiece is forced by the ram into said cavity to fill the same and thereby acquire a predetermined configuration, after which the ram and then the dies are retracted from the workpiece.

9. The structure of claim 8 wherein said hydraulic equalizing means comprises a hydraulic piston-cylinder control mechanism on each die with the piston thereof being directly secured to the die, and including hydraulic conduit means containing pressurized hydraulic fluid and connecting the bottom side of each cylinder with the top side of a next adjacent cylinder in a closed circuit, whereby hydraulic fluid is pressure fed from the bottom of each piston to the top side of the next adjacent piston in a closed circuit to equalize linear displacement of the dies and to balance the applied load between the dies.

10. The structure of claim 8 wherein said line is the longitudinal axis of the ram, and said dies contact both the workpiece and the ram to form the pressure vessel cavity.

11. The structure of claim 8 wherein the dies are reciprocably mounted radially in a circle and in one plane.

12. The structure of claim 8 wherein said actuating means comprises a hydraulic piston-cylinder power mechanism connected to each die and including coacting hydraulic conduit means containing pressurized fluid interconnected to all such power mechanisms for reciprocating the dies in unison to and away from said point.

13. The structure of claim 8 and further including backing plates positioned against said dies on the distal side thereof with respect to the ram when the workpiece is forced into the cavity, said backing plates retaining the dies in operative position when the workpiece is forced into the cavity.

14. The structure of claim 11 wherein said hydraulic equalizing means comprises a hydraulic piston-cylinder control mechanism on each die with the piston thereof being directly secured to the die and including hydraulic conduit means containing pressurized hydraulic fluid connecting the bottom side of each cylinder with the top side of a next adjacent cylinder in series around the circle in a closed circuit whereby hydraulic fluid is pressure fed from the bottom of each piston to the top side of the next adjacent piston in series around the circle in a closed circuit to equalize linear displacement of the dies and to balance the applied load between the dies, said line being the longitudinal axis of the ram, said actuating means comprising a hydraulic piston-cylinder power mechanism connected to each die with hydraulic conduit means containing pressurized fluid interconnected to all such power mechanisms for reciprocating the dies in unison to and away from said point, and stationary backing plates positioned against said dies on the distal side thereof with respect to the direction of travel of the ram for retaining the dies in operative position when the workpiece is forced into the cavity.

15. A forming machine for forming an associated workpiece comprising, a plurality of elongated dies mounted for reciprocation along their longitudinal axes to a common point, the associated workpiece being disposed at said point, each of said dies having a pair of spaced pistons thereon including an inwardly disposed control piston operatively disposed in a control cylinder and an outwardly disposed power piston operatively disposed in a separate power cylinder, a hydraulic power circuit interconnecting all of said power pistons for effecting an applied load to all of the power pistons and reciprocating the dies in unison to and away from the workpiece to form the same into a predetermined configuration, and coacting hydraulic equalizing means interconnected to the control cylinders comprising hydraulic conduit means containing pressurized hydraulic fluid and connecting the bottom side of each control cylinder with the top side of a next adjacent control cylinder in a closed circuit whereby the hydraulic fluid is pressure fed from the bottom of each control piston to the top side of the next adjacent control piston in a closed circuit to equalize linear displacement of the dies and to balance the applied load between the dies.

16. The structure of claim 15 wherein said dies are mounted radially in a circle and in one plane.

17. The structure of claim 15 and further including a centerpost disposed at said point and containing said workpiece, said dies being reciprocable to the workpiece to crimp the same and retract therefrom while it is being held by the centerpost.

18. The structure of claim 15 and further including a reciprocable ram having the workpiece detachably secured thereto and disposed at said point, said dies being configured to form a pressure vessel cavity when such dies contact the workpiece, and means for displacing the ram with the workpiece thereon toward the cavity whereby at least a portion of the workpiece is forced into the cavity to fill the same and thereby acquire a predetermined configuration.

19. The structure of claim 18 wherein the ram is reciprocably displaceable along the longitudinal axis of the ram, and said dies contact both the workpiece and the ram to form the pressure vessel cavity.

20. The structure of claim 18 and further including backing plates positioned against said dies on the distal side thereof with respect to the ram when the workpiece is forced into the cavity, said backing plates retaining the dies in operative position when the workpiece is forced into the cavity.

21. The structure of claim 15 wherein the control cylinder and the power cylinder on each die are hydraulically interconnected by a pair of separable hydraulic conduits leading from the bottom side of the power cylinder to the top side of the control cylinder, with one of said conduits containing a preset one-way valve for admitting pressurized fluid of predetermined pressure from the bottom side of the power cylinder to the top side of the control cylinder to replenish hydraulic fluid in the control cylinder, and with the other of said conduits containing a preset one-way valve for admitting pressurized fluid of predetermined pressure from the top side of the control cylinder to the bottom side of the power cylinder when the hydraulic fluid at the top side of the control cylinder exceeds a predetermined pressure.

References Cited

UNITED STATES PATENTS

| 443,030 | 12/1890 | Wood | 72—402 |
| 467,657 | 1/1892 | Wood | 72—402 |

RONALD D. CREFE, *Primary Examiner.*

U.S. Cl. X.R.

72—453